United States Patent [19]
Beuving et al.

[11] Patent Number: 5,129,435
[45] Date of Patent: Jul. 14, 1992

[54] APPARATUS AND METHOD FOR IMPROVING FIBERBOARD MAT MOLDABILITY

[75] Inventors: Lauren J. Beuving, Redwood Valley; Peter E. Prader, Ukiah, both of Calif.

[73] Assignee: Masonite Corporation, Chicago, Ill.

[21] Appl. No.: 614,247

[22] Filed: Nov. 15, 1990

[51] Int. Cl.⁵ .................................................. B27N 7/00
[52] U.S. Cl. .................................. 144/2 R; 144/362; 83/660
[58] Field of Search ............... 264/DIG. 8; 28/106; 225/3, 93, 97; 144/42, 361, 362, 41, 2 R; 83/660, 678, 861, 866

[56] References Cited

U.S. PATENT DOCUMENTS

| | | | |
|---|---|---|---|
| 2,940,489 | 6/1960 | Feiner | 144/136 R |
| 3,081,159 | 3/1963 | Brown | 427/274 |
| 3,416,772 | 12/1968 | Sheehan | 225/3 |
| 3,674,219 | 7/1972 | Harvey, Jr. | 144/2 R X |
| 3,678,974 | 7/1972 | O'Brien | 144/2 R |
| 4,137,956 | 2/1979 | Toberg | 144/2 R X |
| 4,167,130 | 9/1979 | Miller | 83/678 X |
| 4,655,869 | 4/1987 | Tellman et al. | 156/252 |
| 4,691,629 | 9/1987 | Koba | 100/121 |
| 4,706,722 | 11/1987 | Silcox | 144/329 |
| 4,790,360 | 12/1980 | Clarke et al. | 144/213 |
| 4,796,680 | 1/1989 | Koba | 144/2 R |
| 4,836,254 | 6/1989 | Ruddick | 144/362 |

*Primary Examiner*—Hien H. Phan
*Assistant Examiner*—Raymond D. Woods
*Attorney, Agent, or Firm*—Marshall, O'Toole, Gerstein, Murray & Bicknell

[57] ABSTRACT

Apparatus for cutting discontinuous incisions into opposing surfaces of a fiberboard mat to condition it for molding into three dimensional panels, i.e. door panels, comprising a first pair of horizontal rollers comprising an upper roller and a lower roller with a gap between the two rollers; a second pair of horizontal rollers comprising an upper roller and a lower roller with a gap between the two rollers; the gaps defining a horizontal path along which a fiberboard can travel; each of the rollers having a multitude of sharp cutter blades capable of making discontinuous incisions in the adjoining surface of a fiberboard mat.

39 Claims, 7 Drawing Sheets

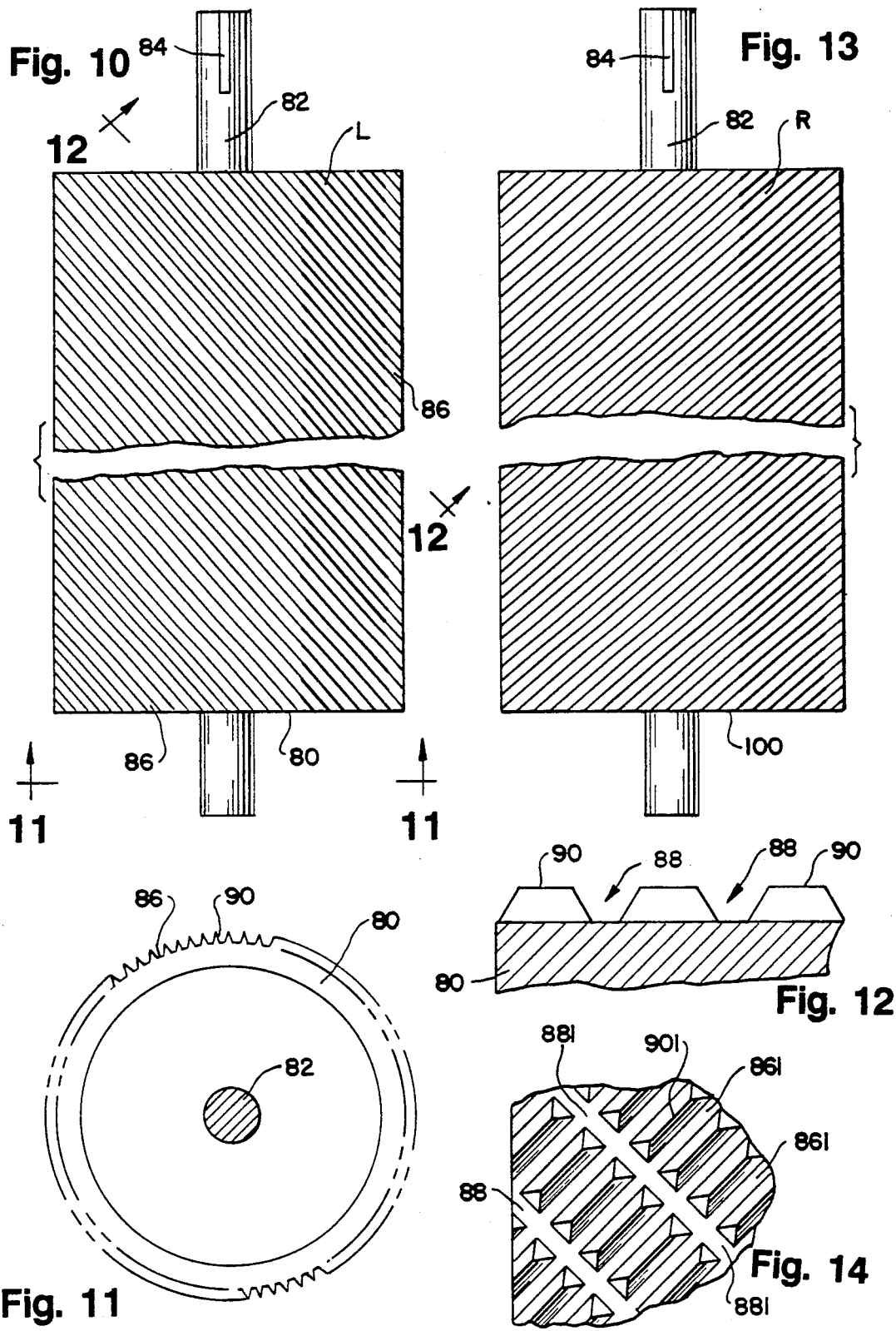

APPARATUS AND METHOD FOR IMPROVING FIBERBOARD MAT MOLDABILITY

FIELD OF THE INVENTION

This invention relates to apparatus and methods for processing fiberboard mats to condition them for molding into three dimensional objects of improved quality. More particularly, this invention provides apparatus and methods by which fiberboard mats can be incised on both upper and lower surfaces in a one pass or one direction feeding operation which loosens the mats by disrupting the fiber network, makes them pliable and leaves them with little memory so that during molding the fibers can be displaced and smoothly directed into the mold sections during hot pressing.

BACKGROUND OF THE INVENTION

The manufacture of rigid hardboard sheets generally involves compressing fiberboard mats with heat and pressure and the inclusion of one or more adhesives or binders. This process involves no particular problems when flat uniformly thick planar hardboard sheets are produced. However, the production of three dimensional non-planar hardboard panels, especially door facings, from fiberboard mats by matched die set molding causes stretch marks and fractures in deeply molded areas or regions adjacent thereto. In a molding press, the tension and compression applied to the mat by the die set pull and push the fibers of an internally self-supporting fiberboard mat apart, sometimes to the breaking point. This is a particularly significant problem with fiberboard mats which have little or no resinous binders which would flow in response to said forces to fill the space around the contours and angles of the die set to which the relatively inelastic fibers could not flow.

The described problem is particularly troublesome when the fiberboard mat used in the molding process is produced by the water felted process. The resulting mat, which contains a minimum amount of a binder or resin, is sufficiently stiff or semi-rigid, due to its integral strength, as to be substantially self-supporting thereby permitting it to be handled manually without a separate support. However, the inherent stiffness or semi-rigidity of the mat prevents the production of high quality non-planar hardboard from such a mat by die set molding. A need accordingly exists for apparatus and methods which can be used to condition such mats, as well as mats made by other than the water-felted method, so that they can be used in die set molding to yield high quality hardboard three dimensional panels.

SUMMARY OF THE INVENTION

According to one aspect of the invention, apparatus is provided for cutting discontinuous incisions into opposing surfaces or faces of a fiberboard mat, said apparatus comprising a first pair of horizontal rollers comprising an upper roller and a lower roller parallel to and adjacent the upper roller with a gap or nip between the two rollers; a second pair of horizontal rollers comprising an upper roller and a lower roller parallel to and adjacent the upper roller with a gap or nip between the two rollers; the gaps between the two pair of rollers defining a substantially horizontal path along which a fiberboard can travel in a linear direction; each of the rollers having a multitude of sharp cutter blades which are capable of making discontinuous incisions in the adjoining surface of a fiberboard mat as it travels through the respective gap; means to drive the upper rollers in the same rotary direction at the same surface speed; means to drive the lower rollers in the same rotary direction, but in a rotary direction which is the reverse of the rotary direction of the upper rollers, at the same surface speed; and the surface speed of all the rollers is essentially the same.

Desirably, the blades of the second pair upper roller are angled with respect to the blades of the first pair upper roller; and the blades of the second pair lower roller are angled with respect to the blades of the first pair lower roller. Since the mat fibers are deposited in a random order, angling the blades leads to angled incisions thereby severing more of the fibers regardless of the direction in which particular fibers extend since angled incisions are generally closer together.

The blades of one of the lower rollers and one of the upper rollers can be arranged to make incisions in line with the direction of the travel of the fiberboard mat and the blades of one of the lower rollers and one of the upper rollers can be arranged to make incisions lateral to the direction of travel of the fiberboard mat. Alternatively, the blades of one of the lower rollers and one of the upper rollers can be arranged in a multitude of spiral rows with a right hand turn or clockwise and the blades of one of the lower rollers and one of the upper rollers can be arranged in a multitude of spiral rows with a left hand turn or counterclockwise.

Generally, it is desirable for the blades of the first pair upper roller to be angled with respect to the blades of the second pair upper roller such that many incisions made by the blades of the two upper rollers will intersect and for the blades of the first pair lower roller to be angled with respect to the blades of the second pair lower roller such that many incisions made by the blades of the two lower rollers will intersect.

The apparatus or machine may have a plurality of the first pair of rollers and a plurality of the second pair of rollers. More specifically, the apparatus could have at least two to four first pair of rollers and at least two to four second pair of rollers.

A third pair of horizontal essentially smooth surfaced rollers comprising an upper roller and a lower roller parallel to and adjacent the upper roller with a gap or nip between the two rollers can be positioned downstream of the first and second pair of rollers. Means to drive the upper and lower rollers of the third pair at the same surface speed as the respective upper and lower rollers of the first and second pairs can be included in the apparatus.

Desirably, the gap between the first pair of rollers is vertically higher or lower than the gap between the second pair of rollers so as to cause the fiberboard mat to travel a sinuous-like path. Furthermore, when the second pair of rollers is between the first and third pairs of rollers the gap between the first pair of rollers can be vertically higher or lower than the gap between the second pair of rollers.

The apparatus will generally include means to independently vertically displace each roller of each pair of rollers so as to dimensionally change the gap clearance between the rollers and to position the gap above, below or at essentially the same level as the gap formed by an adjacent pair of rollers.

More specifically, the apparatus can include a pair of vertical spaced apart opposing first and second frames; the first ends of the first pair of rollers can be supported in two separate vertically displaceable bearing blocks one above the other in the first frame and second ends of the first pair of rollers can be supported in two separate vertically displaceable bearing blocks one above the other in the second frame; and the first ends of the second pair of rollers can be supported in two separate vertically displaceable bearing blocks one above the other in the first frame and second ends of the second pair of rollers can be supported in two separate vertically displaceable bearing blocks one above the other in the second frame.

Means is desirably included to vertically equally displace and secure in position the bearing blocks supporting the ends of the first pair upper roller without displacing the first pair lower roller as well as means to vertically equally displace and secure in position the bearing blocks supporting the ends of the first pair lower roller without displacing the first pair upper roller. Furthermore, the apparatus can include means to vertically equally displace and secure in position the bearing blocks supporting the ends of the second pair upper roller without displacing the second pair lower roller as well as means to vertically equally displace and secure in position the bearing blocks supporting the ends of the second pair lower roller without displacing the second pair upper roller.

The first ends of the third pair of rollers can be supported in two separate vertically displaceable bearing blocks one above the other in the first frame and second ends of the third pair of rollers can be supported in two separate vertically displaceable bearing blocks one above the other in the second frame. Furthermore, means can be included to vertically equally displace the bearing blocks supporting the ends of the third pair upper roller without displacing the third pair lower roller as well as means to vertically equally displace the bearing blocks supporting the ends of the third pair lower roller without displacing the third pair upper roller.

Vertically positioned horizontally spaced apart track means can be joined to the first frame supporting the pair of bearing blocks for the first ends of the first pair of rollers and vertically positioned horizontally spaced apart track means can be joined to the first frame supporting the pair of bearing blocks for the first ends of the second pair of rollers; vertically positioned horizontally spaced apart track means can be joined to the second frame supporting the pair of bearing blocks for the second ends of the first pair of rollers and vertically positioned horizontally spaced apart track means can be joined to the second frame supporting the pair of bearing blocks for the second ends of the second pair of rollers; and vertically positioned horizontally spaced apart track means can be joined to the first frame supporting the pair of bearing blocks for the first ends of the third pair of rollers and vertically positioned horizontally spaced apart track means can be joined to the second frame supporting the pair of bearing blocks for the second ends of the third pair of rollers.

Sprocket means can be located on the first ends of the first, second and third pairs of rollers and a chain loop can engage the sprockets in consecutive order and with a drive means sprocket so as to drive the rollers, and to drive the upper roller of each pair of rollers in one rotary direction and to drive the lower roller of each pair of rollers in a rotary direction which is the reverse of the upper roller of each pair.

A fluid pressure absorbing means can be included in each of the means which can vertically displace a bearing block so as to permit each roller to yield and accommodate an increased load applied by an irregular fiberboard mat passing through the gap between rollers.

According to a second aspect of the invention a method is provided for conditioning a fiberboard mat having upper and lower surfaces for molding it into a three dimensional object comprising making a first series of internally directed discontinuous incisions in the fiberboard mat upper and lower surfaces; making a second series of internally directed discontinuous incisions in areas of the fiberboard mat upper and lower surfaces which contain the first series of incisions; and, desirably, with the incisions of the second series being angled with respect to incisions of the first series.

Incisions of the second series are desirably positioned to intersect incisions of the first series.

More specifically the invention provides a method of simultaneously cutting discontinuous incisions into opposing surfaces or faces of a fiberboard mat to condition it for molding comprising passing a fiberboard mat between a first pair of driven horizontal rollers comprising an upper roller and a lower roller parallel to and adjacent the upper roller with a gap or nip between the two rollers adjusted to compress the fiberboard mat; then passing the fiberboard mat between a second pair of driven horizontal rollers comprising an upper roller and a lower roller parallel to and adjacent the upper roller with a gap or nip between the two rollers adjusted to compress the fiberboard mat; the gaps between the two pair of rollers defining a substantially horizontal path along which the fiberboard mat travels in a linear direction; making discontinuous incisions in the adjoining surfaces of the fiberboard mat as it travels through the respective gap by means of a multitude of sharp cutter blades on each of the rollers; the incisions made by the blades of the second pair upper roller being angled with respect to the incisions made by the blades of the first pair upper roller; and the incisions made by the blades of the second pair lower roller being angled with respect to the incisions made by the blades of the first pair lower roller.

In practicing the method, incisions can be made in the fiberboard mat in line with the direction of travel of the fiberboard mat by means of blades in one of the lower rollers and one of the upper rollers and incisions can be made lateral to the direction of travel by means of blades in one of the lower rollers and one of the upper rollers. Also, incisions can be made in the fiberboard mat by means of blades in one of the lower rollers and one of the upper rollers arranged in a multitude of spiral rows with a right hand turn and incisions can be made in the fiberboard mat by means of blades in one of the upper rollers and one of the lower rollers arranged in a multitude of spiral rows with a left hand turn.

Incisions made in the fiberboard mat upper surface can intersect the same, and incisions made in the fiberboard mat lower surface can intersect the same.

After all of the incisions have been made in the fiberboard mat it can be passed through the gap between a third pair of rollers to compress and align the fibers. This pair of rollers is desirably smooth surfaced.

It is desirable in practicing the described method for the fiberboard to travel a sinuous-like path as it travels through the gaps of the three pair of rollers by having the gap between one pair of rollers in an intermediate position set higher or lower than the gaps between the other two pair of rollers on respective sides of the intermediate pair of rollers.

The fiberboard mat is generally compressed to about one-half to two-thirds its initial thickness as it travels through the gaps between the first, second and third pairs of rollers.

The apparatus and methods are particularly useful for conditioning a fiberboard mat for molding having a density of about 10 to 28 pounds, and preferably up to about 22 pounds, per cubic foot. The fiberboard mat may be a dry, consolidated mass of cellulosic fibers such as paper pulp, wood fibers and other lignocellulosic fibers. The initial nominal thickness of the fiberboard mat may be about one-half to one inch, with a nominal three quarters of an inch thickness generally most suitable. After conditioning, the mat will usually be slightly thicker as a result of the incisions which cut and upset the fibers and loosen them thereby increasing bulking. Thus, a mat having an initial nominal thickness of three-quarters of an inch may increase up to about one-eighth of an inch in thickness.

A mat conditioned as described will have increased pliability with little memory so that during molding the fibers can be displaced and smoothly directed during hot pressing into the mold sections with sharp bas-relief contours.

BRIEF DESCRIPTION OF THE DRAWINGS

FIG. 10 is a plan view of an incisor roller having the blades arranged in a multitude of spiral rows with a 45° left hand (L) or counterclockwise turn;

FIG. 11 is an end or elevation view taken along the line 11—11 of FIG. 10;

FIG. 12 is a section view taken along the line 12—12 of FIG. 10;

FIG. 13 is a plan view of an incisor roller having the blades arranged in a multitude of spiral rows with a 45° right hand (R) or clockwise turn but with the blades otherwise like those in FIGS. 10 to 12;

FIG. 14 is a partial view of the surface area of the encircled portion of the roller illustrated in FIG. 13;

FIG. 22 is an enlarged elevation view of the support structure for one end of a pair of rollers.

DETAILED DESCRIPTION OF THE DRAWINGS

To the extent it is reasonable and practical the same or similar elements appearing in the various drawing figures will be identified by the same numbers.

Figure 1:
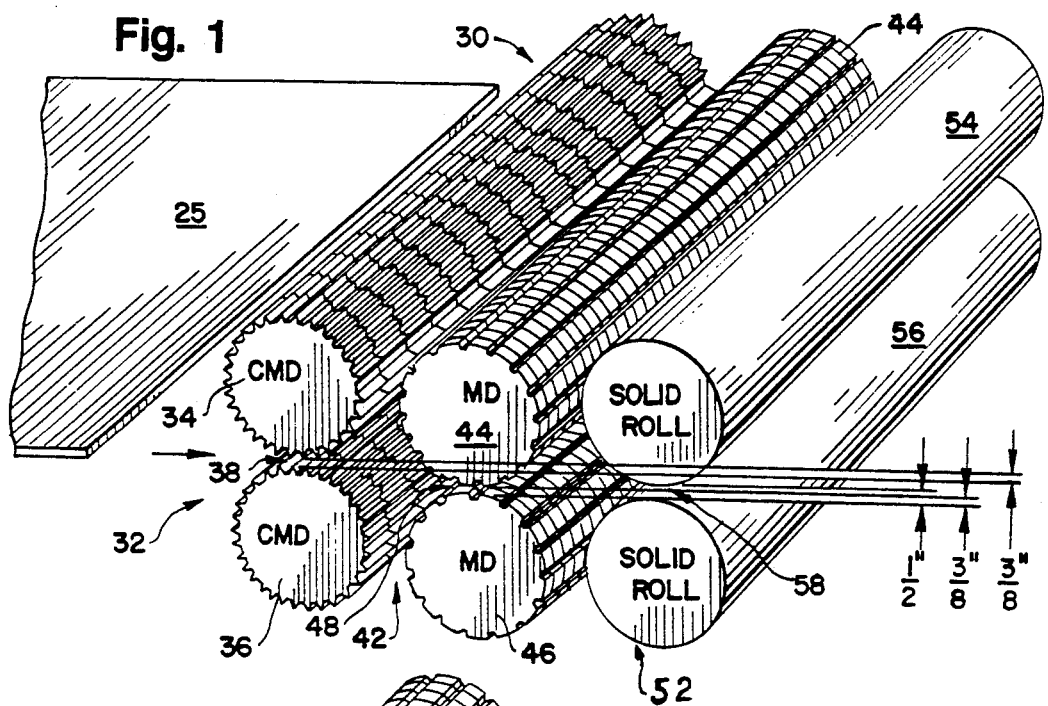
FIG. 1 is an isometric drawing showing an arrangement of two pair of incision making rollers containing blades or cutters and one pair of smooth surface rollers useful in a machine for making incisions in a fiberboard mat according to the invention.

The apparatus or machine 30 shown schematically in FIG. 1 constitutes a relatively simple embodiment of the invention and solely for purposes of clarity a means to drive the rollers is not illustrated. The apparatus 30 includes a first pair 32 of incisor rollers which includes an upper incisor roller 34 and a lower incisor roller 36. The rollers 34,36 are essentially identical in size and shape. They are positioned parallel to one another with the upper incisor roller 34 positioned vertically above the lower incisor roller 36 a slight distance so as to provide a gap or nip 38 between the rollers. The gap 38 will generally be about 0.25 to 0.375 inch when a fiberboard mat 25 having a nominal thickness of 0.75 inch is to be conditioned for molding. The gap in this regard is measured as the distance between the tips of the incisor blades of the two rollers making up the pair.

A second pair 42 of incisor rollers constituting an upper incisor roller 44 and a lower incisor roller 46 is positioned downstream of the first pair of incisor rollers 32. The incisor rollers 44,46 are positioned parallel to one another with the upper incisor roller 44 positioned vertically above the lower incisor roller 46 a slight distance so as to provide a gap or nip 48 between the rollers. This gap can also be about 0.25 to 0.375 inch. However, the gap 48 is desirably located about 0.5 to 1 inch above the gap 38 between the first pair of rollers so as to cause the fiberboard mat to travel a sinuous path as it passes between the first and second pair of rollers. This causes the mat to flex and the mat 25 fibers to be slightly released or loosened.

An optional, but generally desirable, third pair 52 of smooth rollers including an upper smooth surface roller 54 and a lower smooth surface roller 56 can be located downstream of the second pair 42 of rollers. The upper and lower rollers 54,56 are positioned parallel to each other with the upper roller 54 located sufficiently high above the lower roller 56 to provide a gap 58 between the rollers. This gap may be about 0.5 inch. The pair of smooth rollers constituting the third pair serves to reorient the fibers of mat 25 after it has been suitably incised. The gap 58 of the third pair of rollers is desirably in a horizontal plane above or below the plane in which gap 48 of the second pair of incisor rollers 42 is located so as to make the mat 25 travel a moderately sinuous path.

In using an arrangement of rollers as illustrated in FIG. 1 to condition a fiberboard mat 25 for molding, all of the upper rollers are driven in a counterclockwise direction while all of the lower rollers 36,46,56 are driven in a clockwise direction. All of the rollers preferably have the same diameter and will generally be about 6 to 8 inches in diameter. When different diameter rollers are used they are driven so as to have the same surface speed.

Figure 5:
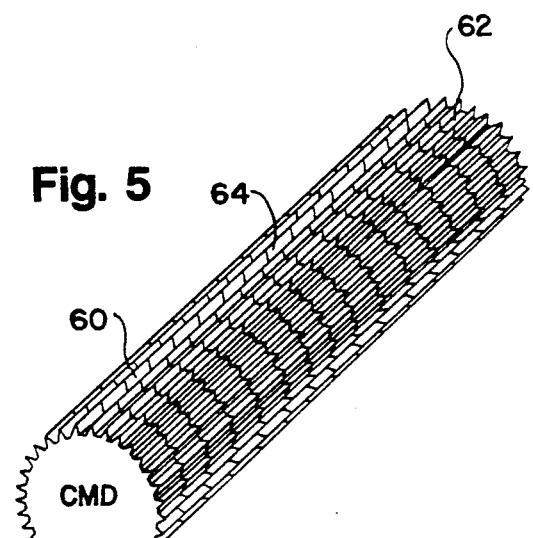
FIG. 5 is an isometric view of an incision making roller shown in FIG. 1 in which the blades are arranged in a machine direction (MD) of travel of the fiberboard mat.
Figure 7:
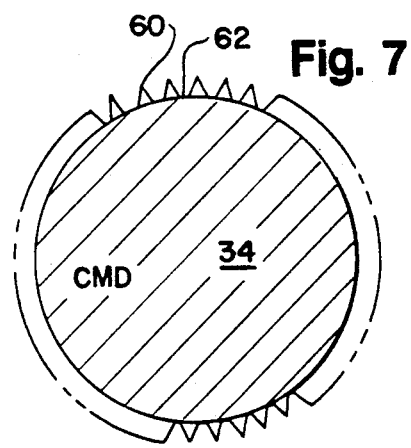
FIG. 7 is a sectional view taken along the line 7—7 of FIG. 6.
Figure 6:
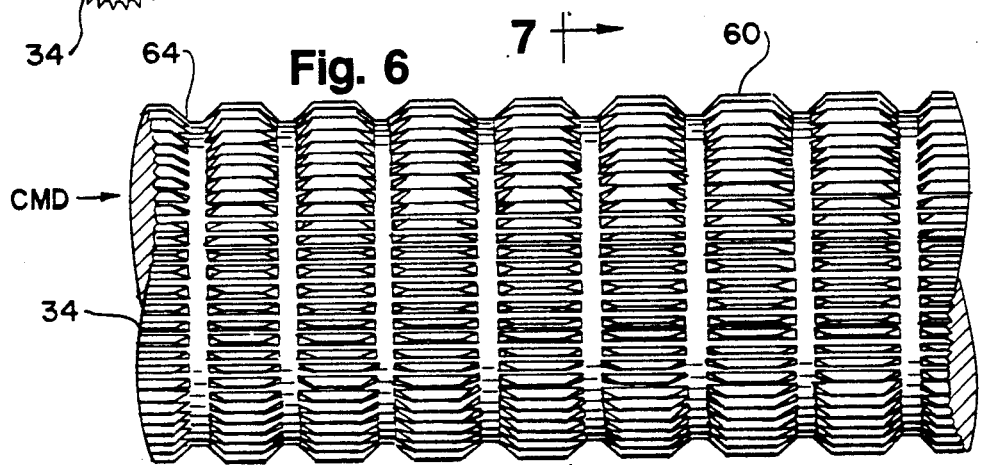
FIG. 6 is a partial side elevation of the incision making roller illustrated in FIG. 5.

FIGS. 5 to 7 illustrate the shape of the blades 60 on upper incisor roller 34 of the first pair 32 of rollers. It should be understood that lower incisor roller 36 has a similar or identical arrangement of blades. Furthermore, the blades can be equally as well referred to as cutters or spikes.

The blades 60 (FIGS. 5 to 7) are defined in part by a plurality of spaced apart grooves 62 cut axially into the surface of roller 34. Two adjacent grooves 62 define opposing downwardly and outwardly sloping sides of the blades 60. A plurality of spaced apart circumferential grooves 64 are also cut into the surface of roller 34. Two adjacent grooves 64 define opposing downwardly and outwardly sloping and diverging ends for each blade 60. The upper edge of each blade 60 is thin and sharp and readily cuts the fibers of fiberboard mat 25. Since the blades 60 are arranged axial to the roller 34 they incise the mat 25 in a cross machine direction. Accordingly, the two rollers 32,34 of the first pair 32 of incisor rollers are marked CMD incisor rollers as shown in FIGS. 1 and 5 to 7.

Figure 8:
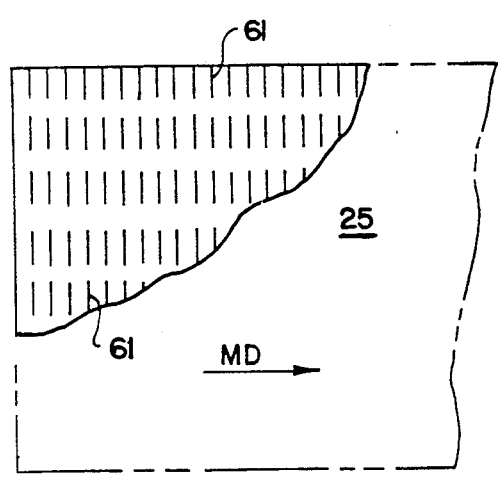
FIG. 8 is a partial plan view of a fiberboard mat showing in a general manner the arrangement of the incisions made through the upper and lower surfaces of the mat when it travels between a pair of rollers having cross machine direction (CMD) blades.

FIG. 8 illustrates in a general way the incisions 61 made in the upper and lower surfaces of mat 25 by the first pair of rollers 32. With a mat having an initial nominal thickness of 0.75 inch, the incisions 61 penetrate downwardly into the upper surface about 0.25 inch and upwardly into the lower surface about 0.25 inch.

Figure 2:
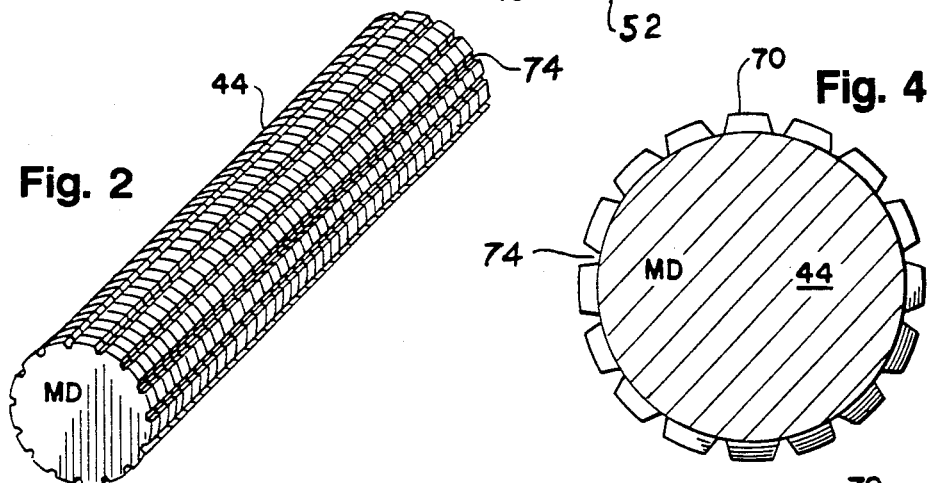
FIG. 2 is an isometric view of an incision making roller shown in FIG. 1 in which the blades are arranged in a cross machine direction (CMD) of travel of the fiberboard mat.
Figure 4:
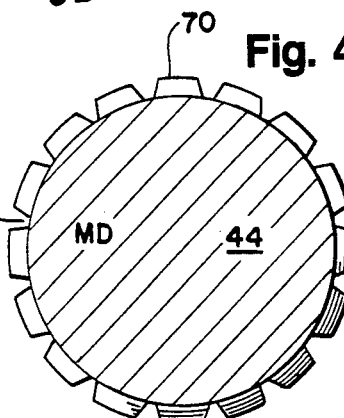
FIG. 4 is a sectional view taken along the line 4—4 of FIG. 3.
Figure 3:
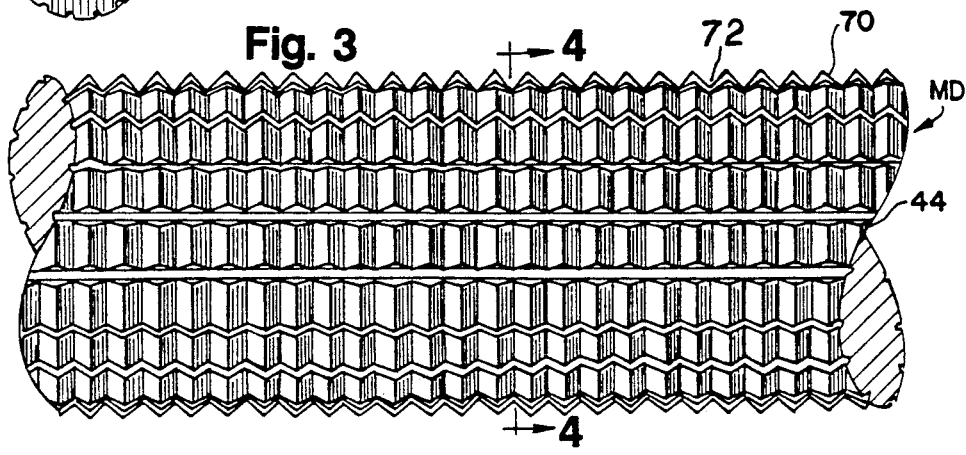
FIG. 3 is a partial side elevation of the incision making roller illustrated in FIG. 2.

FIGS. 2 to 4 illustrate the shape of the blades 70 on upper incisor roller 44 of the second pair 42 of rollers. It should be understood that lower incisor roller 46 has a similar or identical arrangement of blades. Also, these blades can be equally as well referred to as cutters or spikes.

The blades 70 (FIGS. 2 to 4) are defined in part by a plurality of spaced apart peripheral grooves 72 cut into the surface of roller 44. Two adjacent grooves 72 define opposing downwardly and outwardly sloping sides of the blades 70. A plurality of spaced apart grooves 74 are cut axially into the surface of roller 44. Two adjacent grooves 74 define opposing downwardly and outwardly sloping and diverging ends for each blade 70.

The upper edge of each blade 70 is curvilinear, thin and sharp and cuts the fibers of fiberboard mat 25. Since the blades 70 are arranged circumferentially on roller 44 they incise the mat 25 in the machine direction. Accordingly, the two rollers 44,46 of the second pair 42 of incisor rollers are marked MD incisor rollers as shown in FIGS. 1 and 2 to 4.

Figure 9:
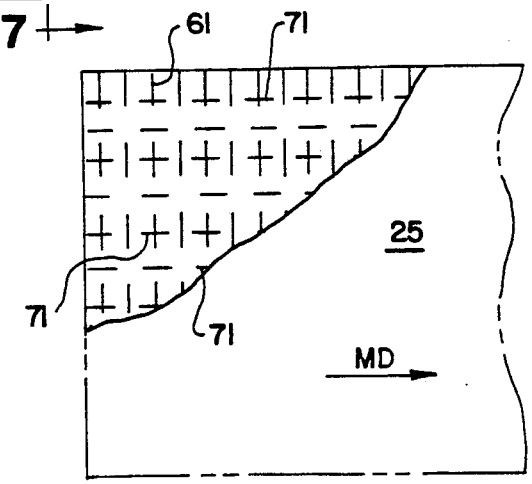
FIG. 9 is a partial plan view of a fiberboard mat showing in a general manner the arrangement of the incisions made through the upper and lower surfaces of the mat after it travels between a pair of rollers having cross machine direction (CMD) blades and a pair of rollers having machine direction (MD) blades.

FIG. 9 illustrates in a general way the incisions 71 made in the upper and lower surfaces of mat 25 by the second pair 42 of incisor rollers 44,46 after the mat has been incised by the first pair 32 of incisor rollers. Usually many of the incisions 71 intersect the incisions 61 but it is not essential for acceptable mat conditioning for the incisions to intersect to any appreciable extent. With a mat having an initial nominal thickness of 0.75 inch, the incisions 71 penetrate downwardly into the upper surface about 0.25 inch and upwardly into the lower surface about 0.25 inch as measured following reexpansion of the mat after it leaves the machine.

FIGS. 10 to 15 illustrate left and right hand incisor rollers which have the blades arranged spiral at a 45° angle or pitch. The left hand incisor roller 80 and the right hand incisor roller 100 are essentially identical except for the direction of the spiral angle at which the blades are aligned. Each roller 80 thus may be considered to be a mirror image of the other roller 100.

The left hand incisor roller 80 is mounted on a support shaft or axle 82 having a slot 84 at one end for receiving a drive sprocket (not shown) in keyed arrangement. The blades 90 (FIGS. 10 to 14) are defined in part by a multitude of spaced apart left hand spiral grooves 86 which extend for the length of the incisor roller 80. Two adjacent grooves 86 define opposing downwardly and outwardly sloping sides of the blades 90. A multitude of spaced apart right hand spiral grooves 88 are also cut into the surface of roller 80. Two adjacent grooves 88 define opposing downwardly and outwardly sloping and diverging ends for each blade 90. The upper edge of each blade 90 is thin and sharp and readily cuts fibers of mat 25.

With regard to the right hand spiral incisor roller 100 it contains blades 901 arranged in a right hand spiral pattern but otherwise are identical to blades 90. The blades 901 are defined by right hand spaced apart grooves 861 which are mirror images of left hand spiral grooves 86. Similarly, the ends of blades 901 are defined by left hand spaced apart spiral grooves 881 which are mirror images of right hand spiral grooves 88.

Figure 15:
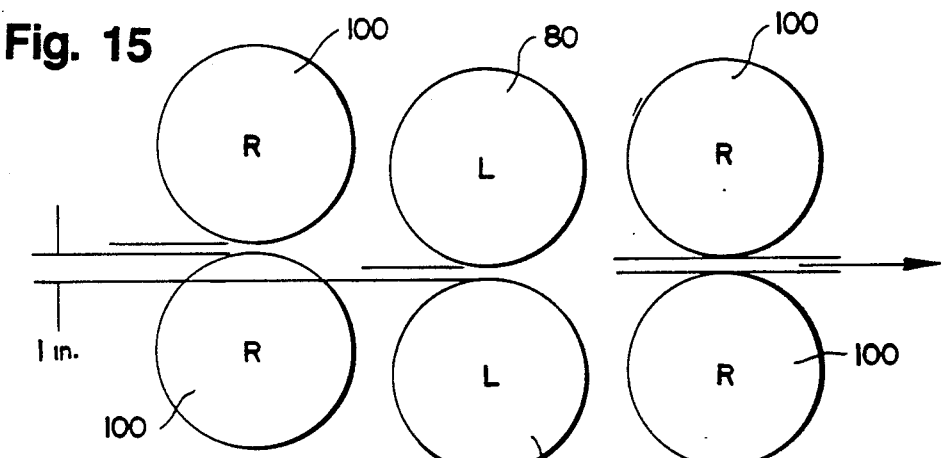
FIG. 15 illustrates an arrangement of two pair of right hand (R) and one pair of left hand (L) incisor spiral rollers which can be used in a machine for incising a fiberboard mat.

The described spiral incisor rollers 80,100 can be used in various arrangements in an apparatus or machine for conditioning a fiberboard mat for molding. One arrangement is shown in FIG. 15 in which two pair of upper and lower right hand rollers are positioned longitudinally spaced apart with a pair of upper and lower left hand rollers in between them. Furthermore, the gaps between the rollers of each pair are located at different vertical heights or positions relative to horizontal planes so as to provide a sinuous path for the mat to travel.

Figure 17:
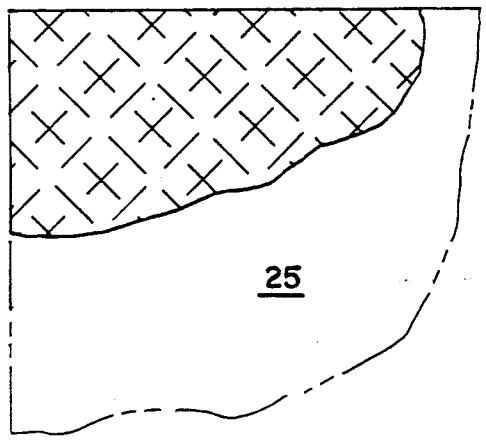
FIG. 17 is a plan view of a fiberboard mat which shows incision marks cut in the upper and lower surfaces after traveling through the gap formed by a pair of rollers having the blades in left hand (L) spiral rows.

Although FIG. 15 shows the use of three pair of spiral rollers it is considered acceptable to use only two pair of rollers with one pair comprising an upper roller 100 and a lower roller 100, and with the other pair comprising an upper roller 80 and a lower roller 80. FIG. 17 illustrates a superimposed pattern of incisions cut into the upper and lower surfaces of a mat by a pair of left hand spiral rollers. A similar superimposed pattern is made by a pair of right hand spiral rollers.

Figure 16:
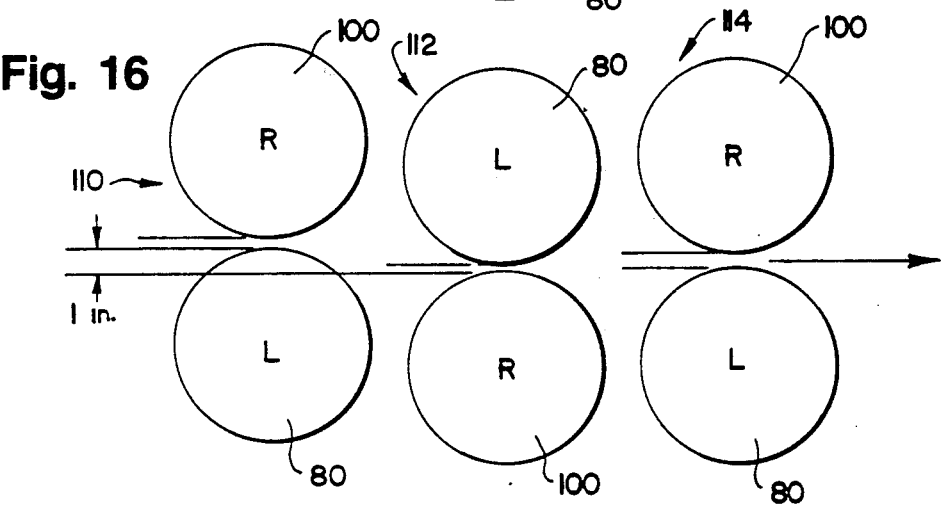
FIG. 16 illustrates an arrangement of three pair of incisor rollers which can be used in a machine for incising a fiberboard mat with each pair of rollers including one right hand (R) and one left hand (L) spiral roller and with the upper roller of each pair alternating in side-by-side arrangement.
Figure 18:
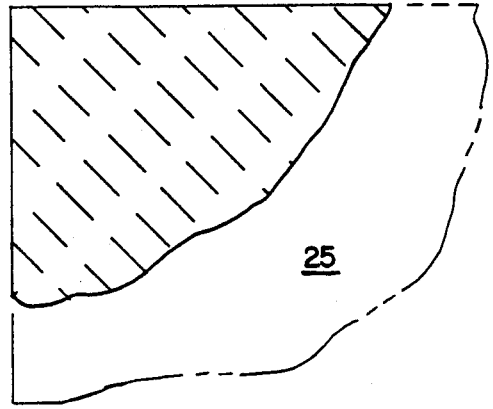
FIG. 18 is a plan view of a fiberboard mat which shows incision marks cut in the upper and lower surfaces after traveling through the gap formed by a pair of rollers having the upper roller blades in left hand (L) spiral rows the and the lower roller blades in right hand (R) spiral rows.

FIG. 16 illustrates still another roller arrangement which incorporates mixed pairs of right turn and left turn spiral rollers. As shown in this drawing the left pair 110 includes a right turn spiral upper roller 100 and a left turn spiral lower roller 80. Such an arrangement of spiral rollers will have the blades of each roller in the gap arranged parallel to one another so that the incisions made in the upper and lower surfaces of the mat when superimposed will have the general arrangement shown in FIG. 18. Therefore, the next or intermediate pair 112 of rollers in the machine should desirably have an opposite or reverse spiral turn for the upper 80 and lower 100 rollers. The right pair 114 of rollers (FIG. 16) has the same arrangement as the left pair 16 so as to make incisions which are angled about 90° to those made by the intermediate pair of rollers 112.

The drawing FIGS. 19 to 22 illustrate in detail a machine which incorporates the invention in a best mode, preferred embodiment for incising a fiberboard mat to condition it for molding. The machine includes a welded structural framework having a horizontal lower member 130, vertical corner posts 132,134 at the mat discharge end and an upper horizontal member 136. The mat entrance end of the machine is of similar construction and includes an upper horizontal member 138 and a vertical corner post 140 with the other corner post being similar.

Figure 21:
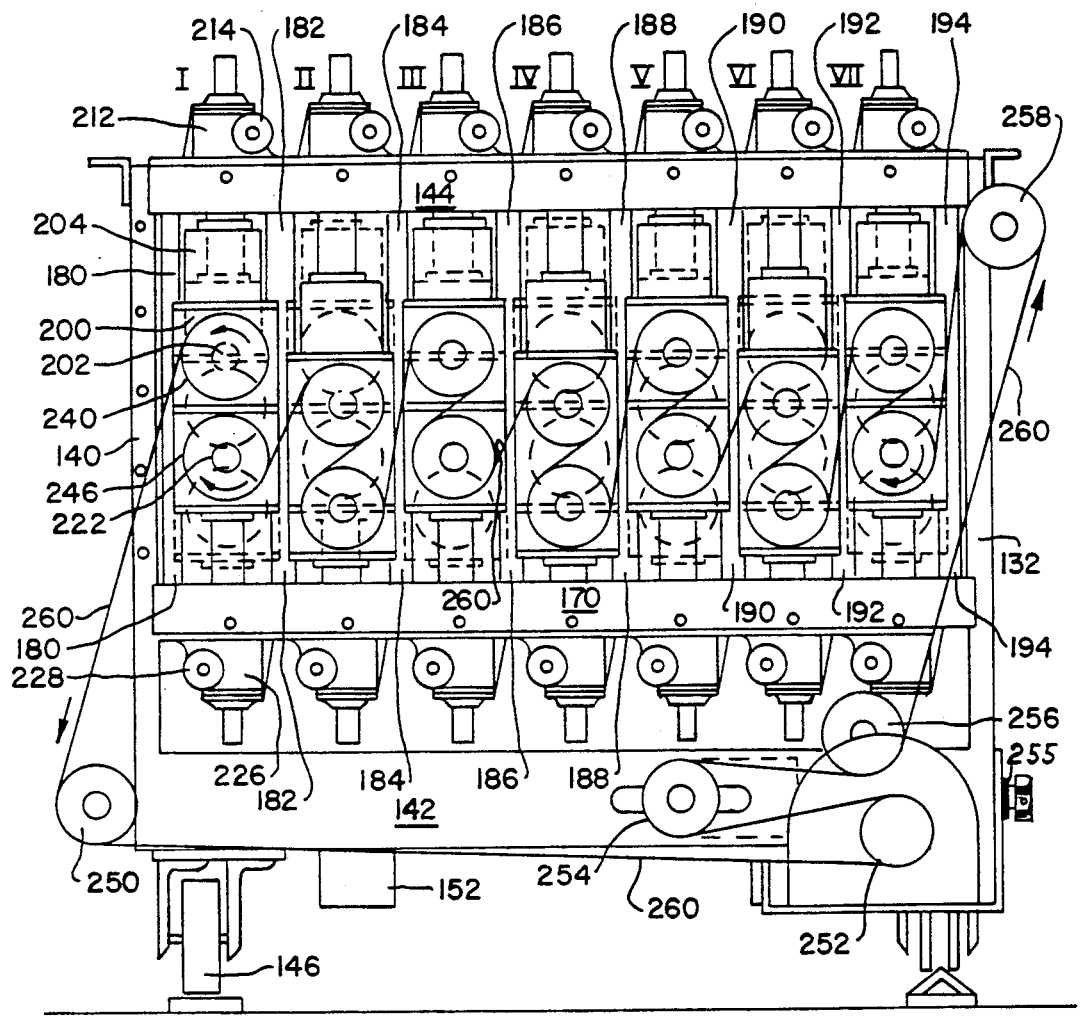
FIG. 21 is a side elevational view of the apparatus illustrated in FIGS. 19 and 20.

As shown in FIG. 21, the roller drive side of the machine has a first side frame which may include a lower horizontal member 142, which extends between and is joined to the posts 132,140, and an upper horizontal bar 144 joined to the upper ends of corner posts 132,140. The other side of the machine, which can be called the roller adjusting side, has a second side frame which may include a lower horizontal member like member 142 and a horizontal bar, similar to horizontal bar 144, joined to the upper ends of the corner posts on the other side of the machine. Some or all of the lower ends of the corner posts may be supported by a wheel 146.

Figure 19:
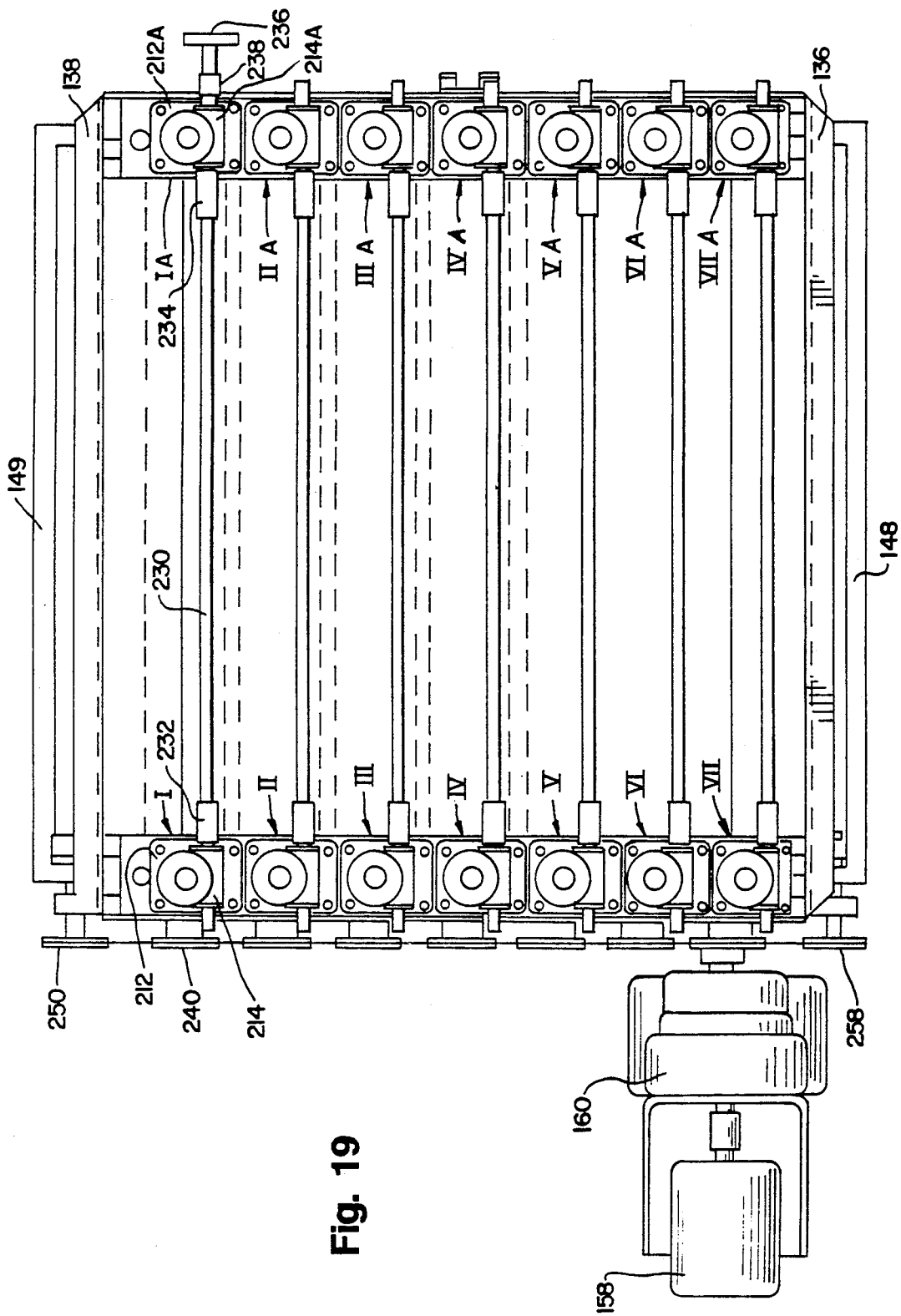
FIG. 19 is a plan view of a specific embodiment of a machine or apparatus incorporating the invention and which constitutes the best mode presently known to the inventors.
Figure 20:
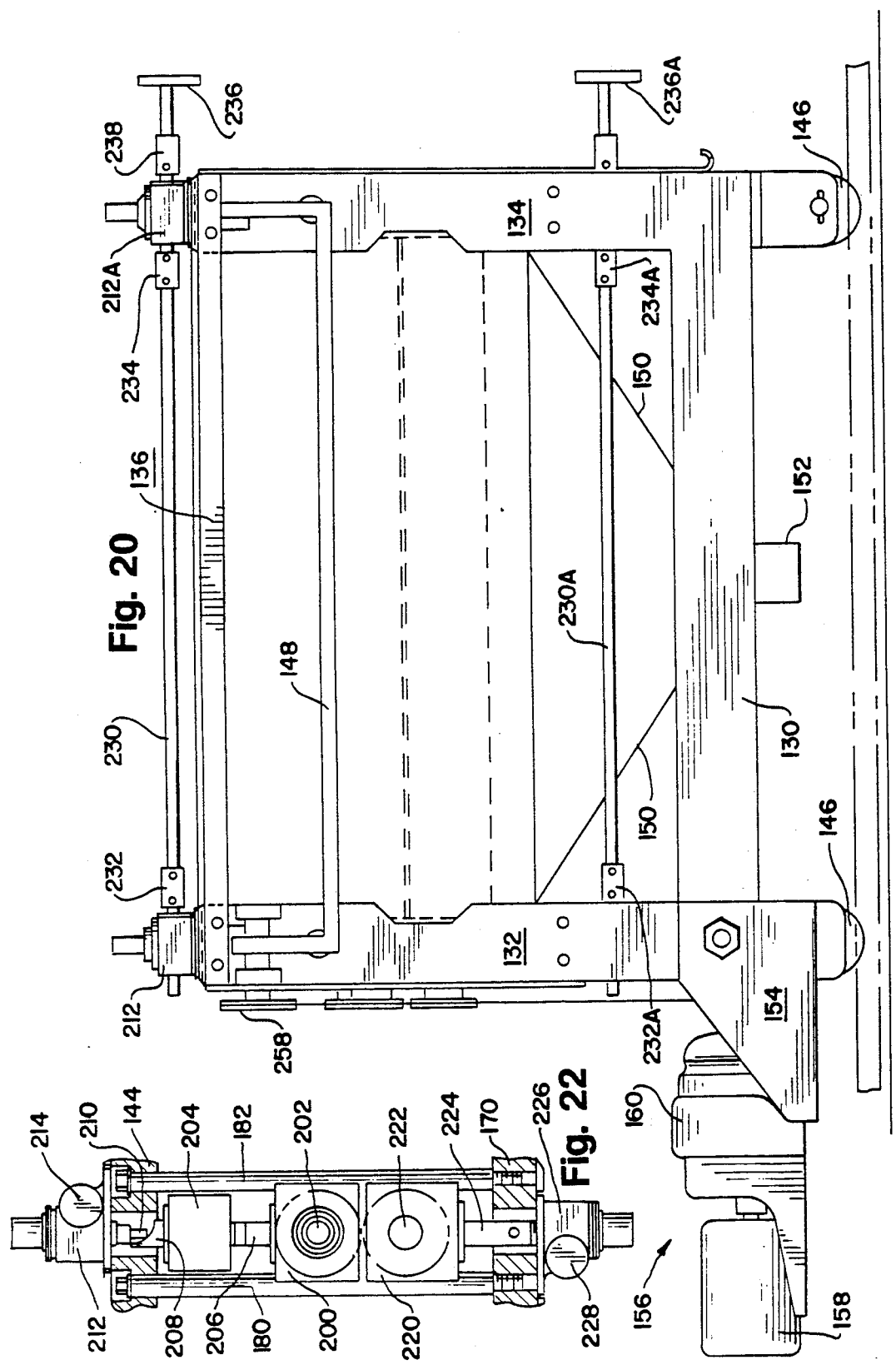
FIG. 20 is an elevation view of the discharge or downstream end of the apparatus illustrated in FIG. 19.

Safety bar 148 (FIG. 20) is located at the discharge end of the machine and in an emergency it is operated to stop or reverse the machine in a known manner which is not part of this invention. A similar safety bar 149 is located at the mat inlet end (FIG. 19). A dust hopper 150 having dust discharge outlet 152 is provided to collect dust loosened from the mat 25.

Bracket 154 is mounted to the lower portion of corner post 132. The bracket 154 supports the roller drive unit 156 which includes an electric motor 158 and gear reducer 160.

The roller drive side (FIG. 21) of the machine is provided with a horizontal bar 170 connected to corner posts 132,140 and a similar horizontal bar is positioned on the opposite side of the framework and is connected to the respective corner posts on that side.

Seven substantially identical vertical units I, II, III, IV, V, VI and VII are arranged along the drive side of the machine framework (FIGS. 21 and 22). Seven such units IA, IIA, IIIA, IVA, VA, VIA, and VIIA are similarly positioned along the other or roller adjusting side of the machine framework (FIG. 19). Each of the units I to VII provides support for two adjacent ends of a pair of rollers, whether incisor or smooth rollers.

Since the units I to VII are essentially identical only unit I will be described in detail. With reference to FIGS. 21 and 22 the vertical spaced apart bar spacers 180,182 are joined at their upper ends to horizontal bar 144 and at their lower ends to horizontal bar 170. The spaced apart vertical bar spacers 184,186,188,190,192,194, which are identical to bar spacers 180,182, are also joined to the horizontal bars 144,170. They are identified and labeled because adjoining pairs of such vertical bars function to movably secure a respective pair of roller bearing supports for the units II, III, IV, V, VI and VII in the same manner as for unit I. Identical vertical bars are on the other side of the machine.

As shown in FIG. 22 an upper bearing block 200 is vertically movably secured between vertical rods 180,182. The block 200 supports one end of the shaft or axle 202 for an upper incisor roller of a pair of rollers. Air cylinder 204 is connected to bearing block 200 by extension shaft 206. The top of air cylinder 204 is joined to a jack screw extension 208 which in turn is connected to the end of the jack screw 210. The jack screw 210 forms part of a jack 212 operated by a worm gear 214. The jack 212 has the capacity to vertically displace the bearing block 200 about two inches. Furthermore, the air cylinder 204 permits the bearing block 200 to yield if a sudden unexpected load is applied to the pair of rollers by means of an off-size mat traveling through the gap.

The unit I shown in FIG. 22 also includes a lower bearing block 220 mounted between vertical rods 180,182 and directly below upper bearing block 200. The lower bearing block 220 supports the axle 222 of a lower incisor roller of a pair of incisor rollers. The lower bearing block 220 is connected at the bottom to a jack screw extension 224 which in turn- is joined to a screw jack 226 operated by a worm gear 228. The screw jack 226 has the capability of raising and lowering the lower bearing block about 2 inches.

An extension shaft 230 is connected to worm gear 214 by a coupler 232 and the shaft 230 is connected to worm gear 214A by a coupler 234. Additionally, the worm gear 214A is operatively connected by a coupler 238 to a handle 236. Worm gear 214A operates a jack 212A which is like jack 212. By manually turning the handle 236 the upper bearing blocks in units I and IA are simultaneously vertically displaced and thereby equally raise and lower both ends of the upper roller. The worm gears of the screw jacks at the lower ends of units I and IA are similarly connected by an extension shaft 230A and couplings 232A and 234A. Handle 236A, similar to handle 236, is also provided to permit manual vertical displacement of the two lower bearing blocks for a distance of about two inches.

Further in regard to unit I, the drive end of the shaft 202 containing an upper roller has a sprocket 240 and the drive end of the shaft 222 containing a lower roller has a sprocket 246. The drive ends of the shaft supporting pairs of upper and lower rollers in units II, III, IV, V, VI and VII also have sprockets of the same size as those described regarding unit I. A drive chain 260 loops partially around the lower sprocket of each unit I to VII in a clockwise direction and then through the gap between the two sprockets to loop partially around the upper sprocket in a counterclockwise direction. The chain then continues its run to the lower sprocket of the next adjacent unit I to VII where it loops partially around said sprocket in a clockwise direction. After the drive chain clears the left-most unit I it travels downward and then around idler sprocket 250 from which it runs to sprocket 252 mounted on the output of the gear reducer 160. The chain 260 continues its run from sprocket 252 to take-up sprocket 254 which is adjustable by take-up screw 255 (FIG. 21). From sprocket 254 the chain 260 runs under idler sprocket 256 and then over idler sprocket 258 from which the chain runs to the bottom of the sprocket on the shaft having the lower roller of unit VII. The described drive chain arrangement drives the rollers of each pair in counter rotary directions. The upper roller is driven counterclockwise and the bottom roller is driven clockwise.

Each of the units I-IA; II-IIA; III-IIIA; IV-IVA; V-VA; VI-VIA; and VII-VIIA supports a pair of rollers and all of the rollers are incisor rollers except that the pair of rollers supported by units VII-VIIA are smooth surface rollers. The two incisor rollers making up the pair of rollers supported by units I-IA are identical and have the structure illustrated by FIGS. 2 to 4. The pairs of rollers supported by units IV-IVA and V-VA have the same structure as those in units I-IA. As a result all six rollers have the same size and same shape blades. Since these rollers when paired have been referred to previously herein as a second pair of rollers it can be said that units I-IA, IV-IVA; and V-VA each support a second pair-type of rollers. There are thus three pair of rollers of the second pair-type in the machine although one such pair could be eliminated if found desirable thereby leaving two pair of rollers of the second pair-type in the machine.

The two incisor rollers making up the pair of rollers supported by units II-IIA; III-IIIA; and VI-VIA are identical and have the structure illustrated by FIGS. 5 to 7. Thus, all six incisor rollers of these units have the same size and same shape blades. Since these rollers when paired have been referred to previously herein as a first pair of rollers it can be said that II-IIA; III-IIIA; and VI-VIA each support a first pair-type of rollers. There are thus three pair of rollers of the first pair-type in the machine although one such pair could be eliminated if found desirable thereby leaving two pair of rollers of the first pair-type in the machine.

Since the rollers of each pair are vertically adjustable the gap between rollers of each pair can be adjusted. Furthermore, the gap between one pair of rollers can be located higher or lower than the gap between any adjoining pair of rollers so as to have the mat travel a slightly sinuous route as it moves through the machine.

The foregoing detailed description has been given for clearness of understanding only, and no unnecessary limitations should be understood therefrom, as modifications will be obvious to those skilled in the art.

What is claimed is:

1. Apparatus for cutting discontinuous incisions into opposing surfaces of a fiberboard mat, said apparatus comprising:
   a first pair of horizontal rollers comprising an upper roller and a lower roller parallel to and adjacent the upper roller with a gap between the two rollers;
   a second pair of horizontal rollers comprising an upper roller and a lower roller parallel to and adjacent the upper roller with a gap between the two rollers;
   the gaps between the two pair of rollers defining a substantially horizontal path along which a fiberboard travels in a linear direction;
   each of the rollers having a multitude of sharp cutter blades which are capable of making discontinuous incisions in an adjoining surface of a fiberboard mat as it travels through the respective gap;
   the blades of the second pair upper roller being angled with respect to the blades of the first pair upper roller;
   the blades of the second pair lower roller being angled with respect to the blades of the first pair lower roller;
   means to drive the upper rollers in the same rotary direction at the same surface speed;
   means to drive the lower rollers in the same rotary direction, but in a rotary direction which is the reverse of the rotary direction of the upper rollers, at the same surface speed; and
   the surface speed of all the rollers is essentially the same.

2. Apparatus according to claim 1 in which:
   the blades of one of the lower rollers and one of the upper rollers are arranged to make incisions in line with the direction of the travel of the fiberboard mat; and
   the blades of one of the lower rollers and one of the upper rollers are arranged to make incisions lateral to the direction of travel of the fiberboard mat.

3. Apparatus according to claim 1 in which:
   the blades of one of the lower rollers and one of the upper rollers are arranged in a multitude of spiral rows with a right hand turn; and
   the blades of one of the lower rollers and one of the upper rollers are arranged in a multitude of spiral rows with a left hand turn.

4. Apparatus according to claim 1, 2 or 3 in which:
   the blades of the first pair upper roller are angled with respect to the blades of the second pair upper roller such that many incisions made by the blades of the two upper rollers intersect; and
   the blades of the first pair lower roller are angled with respect to the blades of the second pair lower roller such that many incisions made by the blades of the two lower rollers intersect.

5. Apparatus according to claim 1 comprising:
   a third pair of horizontal essentially smooth surfaced rollers comprising an upper roller and a lower roller parallel to and adjacent the upper roller with a gap between the two rollers;
   the third pair of rollers being positioned downstream of the first and second pair of rollers; and
   means to drive the upper and lower rollers of the third pair at the same surface speed as the respective upper and lower rollers of the first and second pairs.

6. Apparatus according to claim 1 or 5 in which:
   the gap between the first pair of rollers is vertically higher or lower than the gap between the second pair of rollers.

7. Apparatus according to claim 5 in which:
   the second pair of rollers is between the first and third pairs of rollers; and
   the gap between the first pair of rollers is vertically higher or lower than the gap between the second pair of rollers.

8. Apparatus according to claim 1 or 5 comprising:
   means to independently vertically displace each roller of each pair of rollers so as to dimensionally change the gap between the rollers and to position the gap above, below or at essentially the same level as the gap formed by an adjacent pair of rollers.

9. Apparatus according to claim 1 comprising:

a pair of vertical spaced apart opposing first and second side frames;

first ends of the first pair of rollers being supported in two separate vertically displaceable bearing blocks one above the other in the first side frame and second ends of the first pair of rollers being supported in two separate vertically displaceable bearing blocks one above the other in the second side frame; and first ends of the second pair of rollers being supported in two separate vertically displaceable bearing blocks one above the other in the first side frame and second ends of the second pair of rollers being supported in two separate vertically displaceable bearing blocks one above the other in the second side frame.

10. Apparatus according to claim 9 comprising:

means to vertically equally displace and secure in position the bearing blocks supporting the ends of the first pair upper roller without displacing the first pair lower roller; and means to vertically equally displace and secure in position the bearing blocks supporting the ends of the first pair lower roller without displacing the first pair upper roller.

11. Apparatus according to claim 9 comprising:

means to vertically equally displace and secure in position the bearing blocks supporting the ends of the second pair upper roller without displacing the second pair lower roller; and means to vertically equally displace and secure in position the bearing blocks supporting the ends of the second pair lower roller without displacing the second pair upper roller.

12. Apparatus according to claim 11 in which:

a fluid pressure absorbing means is included in each of the means which vertically displaces a bearing block so as to permit each roller to yield and accommodate an increased load applied by an irregular fiberboard mat passing through the gap between rollers.

13. Apparatus according to claim 9 comprising:

a third pair of horizontal essentially smooth surfaced rollers comprising an upper roller and a lower roller parallel to and adjacent the upper roller with a gap between the two rollers;

the third pair of rollers being positioned downstream of the first and second pair of rollers; and means to drive the upper and lower rollers of the third pair at the same surface speed as the respective upper and lower rollers of the first and second pairs.

14. Apparatus according to claim 13 comprising:

first ends of the third pair of rollers being supported in two separate vertically displaceable bearing blocks one above the other in the first side frame and second ends of the third pair of rollers being supported in two separate vertically displaceable bearing blocks one above the other in the second side frame.

15. Apparatus according to claim 14 comprising:

means to vertically equally displace the bearing blocks supporting the ends of the third pair upper roller without displacing the third pair lower roller; and means to vertically equally displace the bearing blocks supporting the ends of the third pair lower roller without displacing the third pair upper roller.

16. Apparatus according to claim 14 comprising:

vertically positioned horizontally spaced apart track means joined to the first side frame supporting the pair of bearing blocks for the first ends of the first pair of rollers and vertically positioned horizontally spaced apart track means joined to the first side frame supporting the pair of bearing blocks for the first ends of the second pair of rollers;

vertically positioned horizontally spaced apart track means joined to the second side frame supporting the pair of bearing blocks for the second ends of the first pair of rollers and vertically positioned horizontally spaced apart track means joined to the second side frame supporting the pair of bearing blocks for the second ends of the second pair of rollers; and vertically positioned horizontally spaced apart track means joined to the first side frame supporting the pair of bearing blocks for the first ends of the third pair of rollers and vertically positioned horizontally spaced apart track means joined to the second side frame supporting the pair of bearing blocks for the second ends of the third pair of rollers.

17. Apparatus according to claim 14 comprising:

sprocket means on the first ends of the first, second and third pairs of rollers; and a chain loop engaging the sprockets in consecutive order and with a drive means sprocket so as to drive the rollers, and to drive the upper roller of each pair of rollers in one rotary direction and to drive the lower roller of each pair of rollers in a rotary direction which is the reverse of the upper roller of each pair.

18. Apparatus according to claim 1 comprising:

a plurality of the first pair of rollers; and a plurality of the second pair of rollers.

19. Apparatus according to claim 18 comprising:

at least two to four first pair of rollers; and at least two to four second pair of rollers.

20. Apparatus according to claim 18 in which:

the gap between at least one of the first pair of rollers is vertically higher or lower than the gap between at least one of the second pair of rollers.

21. Apparatus according to claim 18 comprising:

three first pair of rollers; and three second pair of rollers.

22. Apparatus according to claim 21 in which:

the gap between the three first pair of rollers is vertically higher or lower than the gap between the three second pair of rollers.

23. Apparatus according to claim 22 comprising:

a third pair of horizontal essentially smooth surfaced rollers comprising an upper roller and a lower roller parallel to and adjacent the upper roller with a gap between the two rollers;

the third pair of rollers being positioned downstream of all of the first and second pair of rollers; and means to drive the upper and lower rollers of the third pair at the same linear speed as the respective upper and lower rollers of the first and second pairs.

24. Apparatus for cutting discontinuous incisions into opposing surfaces of a fiberboard mat, said apparatus comprising:

a first pair of horizontal rollers comprising an upper roller and a lower roller parallel to and adjacent the upper roller with a gap between the two rollers;

a second pair of horizontal rollers comprising an upper roller and a lower roller parallel to and adjacent the upper roller with a gap between the two rollers;

the gaps between the two pair of rollers defining a substantially horizontal path along which a fiberboard travels in a linear direction;

each of the rollers having a multitude of sharp cutter blades which are capable f making discontinuous incisions in an adjoining surface of a fiberboard mat as it travels through the respective gap;

means to drive the upper rollers in the same rotary direction at the same surface speed;

means to drive the lower rollers in the same rotary direction, but in a rotary direction which is the reverse of the rotary direction of the upper rollers, at the same surface speed;

means to drive all the rollers at a surface speed which is essentially the same; and one of (A) the gap between the first pair of rollers and (B) the gap between the second pair of rollers being vertically higher than the other gap.

25. Apparatus according to claim 24 comprising:
a plurality of the first pair of rollers; and
a plurality of the second pair of rollers.

26. Apparatus according to claim 25 comprising:
at least two to four first pair of rollers; and
at least two to four second pair of rollers.

27. Apparatus for cutting discontinuous incisions into opposing surfaces of a fiberboard mat, said apparatus comprising:

a first pair of horizontal rollers comprising an upper roller and a lower roller parallel to and adjacent the upper roller with a gap between the two rollers;

a second pair of horizontal rollers comprising an upper roller and a lower roller parallel to and adjacent the upper roller with a gap between the two rollers;

the gaps between the two pair of rollers defining a substantially horizontal path along which a fiberboard travels in a linear direction;

each of the rollers having a multitude of sharp cutter blades which are capable of making discontinuous incisions in an adjoining surface of a fiberboard mat as it travels through the respective gap;

means to drive the upper rollers in the same rotary direction at the same surface speed;

means to drive the lower rollers in the same rotary direction, but in a rotary direction which is the reverse of the rotary direction of the upper rollers, at the same surface speed;

means to drive all the rollers at a surface speed which is essentially the same;

a pair of vertical spaced apart opposing first and second side frames;

first ends of the first pair of rollers being supported in two separate vertically displaceable bearing blocks one above the other in the first side frame and second ends of the first pair of rollers being supported in two separate vertically displaceable bearing blocks one above the other in the second side frame; and first ends of the second pair of roller being supported in two separate vertically displaceable bearing blocks one above the other int eh first side frame and second ends of the second pair of rollers being supported in two separate vertically displaceable bearing blocks one above the other in the second side frame.

28. Apparatus according to claim 27 comprising:
means to vertically equally displace and secure in position the bearing blocks supporting the ends of the first pair upper roller without displacing the first pair lower roller; and
means to vertically equally displace and secure in position the bearing blocks supporting the ends of the first pair lower roller without displacing the first pair upper roller.

29. Apparatus according to claim 27 comprising:
means to vertically equally displace and secure in position the bearing blocks supporting the ends of the second pair upper roller without displacing the second pair lower roller; and
means to vertically equally displace and secure in position the bearing blocks supporting the ends of the second pair lower roller without displacing the second pair upper roller.

30. Apparatus according to claim 29 in which:
a fluid pressure absorbing means is included in each of the means which vertically displaces a bearing block so as to permit each roller to yield and accommodate an increased load applied by an irregular fiberboard mat passing through the gap between rollers.

31. Apparatus according to claim 27 comprising:
a third pair of horizontal essentially smooth surfaced rollers comprising an upper roller and a lower roller parallel to and adjacent the upper roller with a gap between the two rollers;
the third pair of rollers being positioned downstream of the first and second pair of rollers; and
means to drive the upper and lower rollers of the third pair at the same surface speed as the respective upper and lower rollers of the first and second pairs.

32. Apparatus according to claim 31 comprising:
first ends of the third pair of rollers being supported in two separate vertically displaceable bearing blocks one above the other in the first side frame and second ends of the third pair of rollers being supported in two separate vertically displaceable bearing blocks one above the other in the second side frame.

33. Apparatus according to claim 32 comprising:
means to vertically equally displace the bearing blocks supporting the ends of the third pair upper roller without displacing the third pair lower roller; and
means to vertically equally displace the bearing blocks supporting the ends of the third pair lower roller without displacing the third pair upper roller.

34. Apparatus according to claim 32 comprising:
vertically positioned horizontally spaced apart track means joined to the first side frame supporting the pair of bearing blocks for the first ends of the first pair of rollers and vertically positioned horizontally spaced apart track means joined to the first side frame supporting the pair of bearing blocks of the first ends of the second pair of rollers;
vertically positioned horizontally spaced apart track means joined to the second side frame supporting the pair of bearing blocks for the second ends of the first pair of rollers and vertically positioned horizontally spaced apart track means joined to the second side frame supporting the pair of bearing blocks for the second ends of the second pair of rollers; and vertically positioned horizontally spaced apart track means joined to the first side frame supporting the pair of bearing blocks for the first ends of the third pair of rollers and vertically positioned horizontally spaced apart track means joined to the second side frame supporting the pair of bearing blocks for the second ends of the third pair of rollers.

35. Apparatus according to claim 32 comprising:
sprocket means on the first ends of the first, second and third paris of rollers; and
a chain loop engaging the sprockets in consecutive order and with a drive means sprocket so as to drive the rollers, and to drive the upper roller of each pair of rollers in one rotary direction and to drive the lower roller of each pair of rollers in a rotary direction which is the reverse of the upper roller of each pair.

36. Apparatus according to claim 27 comprising:
means to independently vertically displace each roller of each pair of rollers so as to dimensionally change the gap between the rollers and to position the gap at a location selected from the group consisting of above, below and at essentially the same level as the gap formed by an adjacent pair of rollers.

37. Apparatus for cutting discontinuous incisions into opposing surfaces of a fiberboard mat, said apparatus comprising:
a first pair of horizontal rollers comprising an upper roller and a lower roller parallel to and adjacent the upper roller with a gap between the two rollers;
a second pair of horizontal rollers comprising an upper roller and a lower roller parallel to and adjacent the upper roller with a gap between the two rollers;
the gaps between the two pair of rollers defining a substantially horizontal path along which a fiberboard travels in a linear direction;
each of the rollers having a multitude of sharp cutter blades which are capable of making discontinuous incisions in an adjoining surface of a fiberboard mat as it travels through the respective gap;
means to drive the upper rollers in the same rotary direction at the same surface speed;
means to drive the lower rollers in the same rotary direction, but in a rotary direction which is the reverse of the rotary direction of the upper rollers, at the same surface speed;
means to drive all the rollers at a surface speed which is essentially the same;
a third pair of horizontal essentially smooth surfaces rollers comprising an upper roller and a lower roller parallel to and adjacent the upper roller with a gap between the two rollers;
the third pair of rollers being positioned downstream of the first and second pair of rollers;
means to drive the upper and lower rollers of the third pair at the same surface speed as the respective upper and lower rollers of the first and second pairs;
the second pair of rollers being between the first and third paris of rollers; and
one of (A) the gap between the first pair of rollers and (B) the gap between the second pair of rollers being vertically higher than the other gap.

38. Apparatus for cutting discontinuous incisions into opposing surfaces of a fiberboard mat, said apparatus comprising:
three first pair of horizontal rollers;
each first pair of horizontal rollers comprising an upper roller and a lower roller parallel to and adjacent the upper roller with a gap between the two rollers;
three second pair of horizontal rollers;
each second pair of horizontal rollers comprising an upper roller and a lower roller parallel to and adjacent the upper roller with a gap between the two rollers;
the gaps between the pairs of rollers defining a substantially horizontal path along which a fiberboard travels in a linear direction;
each of the rollers having a multitude of sharp cutter blades which are capable of making discontinuous incisions in an adjoining surface of a fiberboard mat as it travels through the respective gap;
means to drive the upper rollers in the same rotary direction at the same surface speed;
means to drive the lower rollers in the same rotary direction, but in a rotary direction which is the reverse of the rotary direction of the upper rollers, at the same surface speed;
means to drive all the rollers at a surface speed which is essentially the same; and
one of (A) the gap between the three first pair of rollers and (B) the gap between the three second pair of rollers is vertically higher than the other gap.

39. Apparatus according to claim 38 comprising:
a third pair of horizontal essentially smooth surfaced rollers comprising an upper roller and a lower roller parallel to and adjacent the upper roller with a gap between the two rollers;
the third pair of rollers being positioned downstream of all of the first and second pair of rollers; and
means to drive the upper and lower rollers of the third pair at the same linear speed as the respective upper and lower rollers of the first and second pairs.

* * * * *